United States Patent
Di Donato et al.

(10) Patent No.: US 8,706,089 B2
(45) Date of Patent: Apr. 22, 2014

(54) CHANGE DETECTION OF TARGET IDENTIFICATION DATA IN LAWFUL INTERCEPTION SYSTEMS

(75) Inventors: Rita Di Donato, Cava de' Tirreni (IT); Roberto Cicco, Cava de Tirreni (IT); Raffaele De Santis, Mercato San Severino (IT); Luca Di Serio, Nocera Inferiore (IT)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 245 days.

(21) Appl. No.: 13/143,496

(22) PCT Filed: Jan. 14, 2009

(86) PCT No.: PCT/EP2009/050386
§ 371 (c)(1),
(2), (4) Date: Jul. 6, 2011

(87) PCT Pub. No.: WO2010/081551
PCT Pub. Date: Jul. 22, 2010

(65) Prior Publication Data
US 2011/0269430 A1 Nov. 3, 2011

(51) Int. Cl.
*H04M 1/725* (2006.01)

(52) U.S. Cl.
USPC ..... 455/412.2; 455/410; 455/411; 455/414.1; 455/414.2; 455/418; 379/32.01; 379/35; 706/933

(58) Field of Classification Search
USPC ............ 455/410, 411, 412.1, 412.2, 455/414.1–414.3, 418–420; 709/224; 379/70–86, 7, 32.01–35; 398/40; 370/241, 401; 706/933
See application file for complete search history.

(56) References Cited

U.S. PATENT DOCUMENTS

| | | | |
|---|---|---|---|
| 2005/0152275 A1 | 7/2005 | Laurila | |
| 2005/0210127 A1* | 9/2005 | Pohja et al. | 709/224 |
| 2006/0253478 A1* | 11/2006 | Graham et al. | 707/100 |

FOREIGN PATENT DOCUMENTS

WO WO 02/085041 A2 10/2002

OTHER PUBLICATIONS

"3rd Generation Partnership Project: Technical Specification Group Services and System Aspects; 3G security; Lawful interception architecture and functions (Release 8)"; ETSI Standard, European Telecommunications Standards Institute (ETSI), Sophia Antipolis Cedex, France, No. V8.6,O, Dec. 1, 2008, pp. 1-128, XP007910143: p. 10-p. 19, p. 34-p. 35, p. 37-p. 40, p. 46-p. 49.

Soliman Elevate Technologies C Castelluccia Inria K Elmalki Athonet I Bellier Inria H: "Hierarchical Mobile IPv6 (HMIPv6) Mobility Management: rfc5380.txt" Hierarchical Mobile IPV6 (HMIPV6) Mobility Management: rfc5380.txt, Internet Engineering Task Force, IETF: Standard, Internet Society CISae) 4, Rue Des Falaises CH-1205 Geneva, Switzerland, Oct. 1, 2008, XP015060354 p. 7-p. 11.

\* cited by examiner

*Primary Examiner* — Ronald Eisner

(57) ABSTRACT

A node of telecommunications network comprises comparing means for comparing current mobile station ID information with previously stored mobile station ID information. The node also comprises preparing means for preparing a notification message including both the previous mobile station ID information and the current mobile station ID information.

6 Claims, 5 Drawing Sheets

CHANGE DETECTION OF TARGET IDENTIFICATION DATA IN LAWFUL INTERCEPTION SYSTEMS

TECHNICAL FIELD

The present invention relates to Lawful Interception and Data Retention systems, in particular to systems and method of interception when a change occurs in mobile station identification parameter values.

BACKGROUND

In many countries operators and Internet service providers are today obliged by legal requirements to provide stored traffic data generated from public telecommunications and Internet services for the purpose of detection, investigation and prosecution of crime and criminal offences, including terrorism.

Usually a public official, for instance a judge, is in charge of authorizing investigation on target persons, allowing to activate lawful interception on their communications or to query on data retention databases. The authorization paper is conventionally referred to as a "warrant", which is provided to lawful enforcement agencies.

According to a received warrant, the lawful enforcement agency (LEA) may set targets of interception and/or query data retention databases.

The target identities for interception may be at least one of the following: International Mobile Subscriber Identity (IMSI), International Mobile Equipment Identity (IMEI), and Mobile Subscriber Integrated Services Digital Network Number (MSISDN).

Each of these codes may univocally identify a user within a network. In particular, IMSI is a numeric code memorized in the SIM card, whose digits identify both the SIM card itself and the mobile network in which the traffic is flowing. IMEI is an alphanumeric code uniquely identifying a mobile phone. MSISDN is the telephone number associated to a SIM card, in a mobile phone.

The standard architecture for Lawful Interception (LI) comprises an Intercepting Control Element (ICE) providing the user equipment of the target user with an access to the telecommunications network. An ICE could be interpreted by a Home Location Register (HLR), which is a central database that contains details of each mobile phone subscriber authorized to use the network. The HLR particularly stores details of every subscriber SIM card issued by a mobile phone operator.

ICEs may also be, among others, a Mobile Services Switching Center (MSC) Server, a Gateway MSC Server (GMSC), a Serving GPRS Support Node (SGSN), or a Gateway GSN (GGSN).

Problems with the existing solutions occur when an intercepted subscriber changes his SIM card and/or his mobile phone with a new one.

In such cases, monitoring activity cannot be pursued anymore because existing systems cannot recognize when a change of IMSI and/or IMEI occurs. This means that a warrant remains set to an old and no more active parameter.

Additionally, nowadays it is quite easy for subscribers to change their SIM cards and/or replacing their mobile equipment with new devices: anytime this situation occurs, there is a change of the IMSI and/or IMEI that negatively affects efficiency and effectiveness of interception activity.

SUMMARY

Aim of the present invention is to overcome the above drawbacks affecting the prior art.

This aim and other objects which will become better apparent hereinafter are achieved by a method for managing the detection of mobile station ID information changes in a telecommunications network, in which current mobile station ID information is compared with previously stored mobile station ID information. A notification message including both the previous mobile station ID information and the current mobile station ID information is automatically prepared and forwarded to receiving administration functions dealing with warrants.

Preferably, the mobile station ID information is at least one of an IMSI, an IMEI, an MSISDN or a combination thereof.

The above steps may be carried out by a node acting as an Intercept Control Element (ICE) within the telecommunications network. Such node acting as an ICE may be a Home Location Register (HLR) node.

The notification message is preferably sent to Lawful Interception Systems.

Moreover, the notification message may be sent to a node managing lawful authorities warrants, which may check existence of warrants related to previous mobile station ID information and automatically update warrants based on the current mobile station ID information.

The above aim and objects are also achieved by a node in a telecommunications network which comprises comparing means for comparing current mobile station ID information with previously stored mobile station ID information. The node also comprises preparing means for preparing a notification message including both the previous mobile station ID information and the current mobile station ID information.

The node may be arranged to operate as an ICE node within the telecommunications network and is preferably an HLR node.

Alternatively, the node may be arranged to operate as a Data Retention Source node within the telecommunications network.

The aim and the objects of the invention are further achieved by a Lawful Interception System comprising an administrative node managing lawful authorities warrants. The administrative node comprises means for receiving a notification message including previous mobile station ID information (IMSI and/or IMEI) and current mobile station ID information (IMSI and/or IMEI). The administrative node also comprises means for verifying the existence of warrants related to the previous mobile station ID information. Furthermore, means for generating an updated warrant based on the current mobile station ID information may be included in the administrative node.

The administrative node may be an LI Administration Function (ADMF) and it may further comprise means for informing law enforcement agencies of the updated warrant.

A delivery function may be also provided in the LI system and arranged to receive the notification message from a node acting as an ICE and to forward the notification message to the administrative node.

According to another aspect of the invention, the aim and objects of the invention are also achieved by a notification message for use in a telecommunications network, comprising both current mobile station ID data and previous mobile station ID data.

BRIEF DESCRIPTION OF THE DRAWINGS

Further characteristics and advantages of the invention will become better apparent from the detailed description of particular but not exclusive embodiments, illustrated by way of non-limiting examples in the accompanying drawings, wherein.

DETAILED DESCRIPTION

Figure 1:
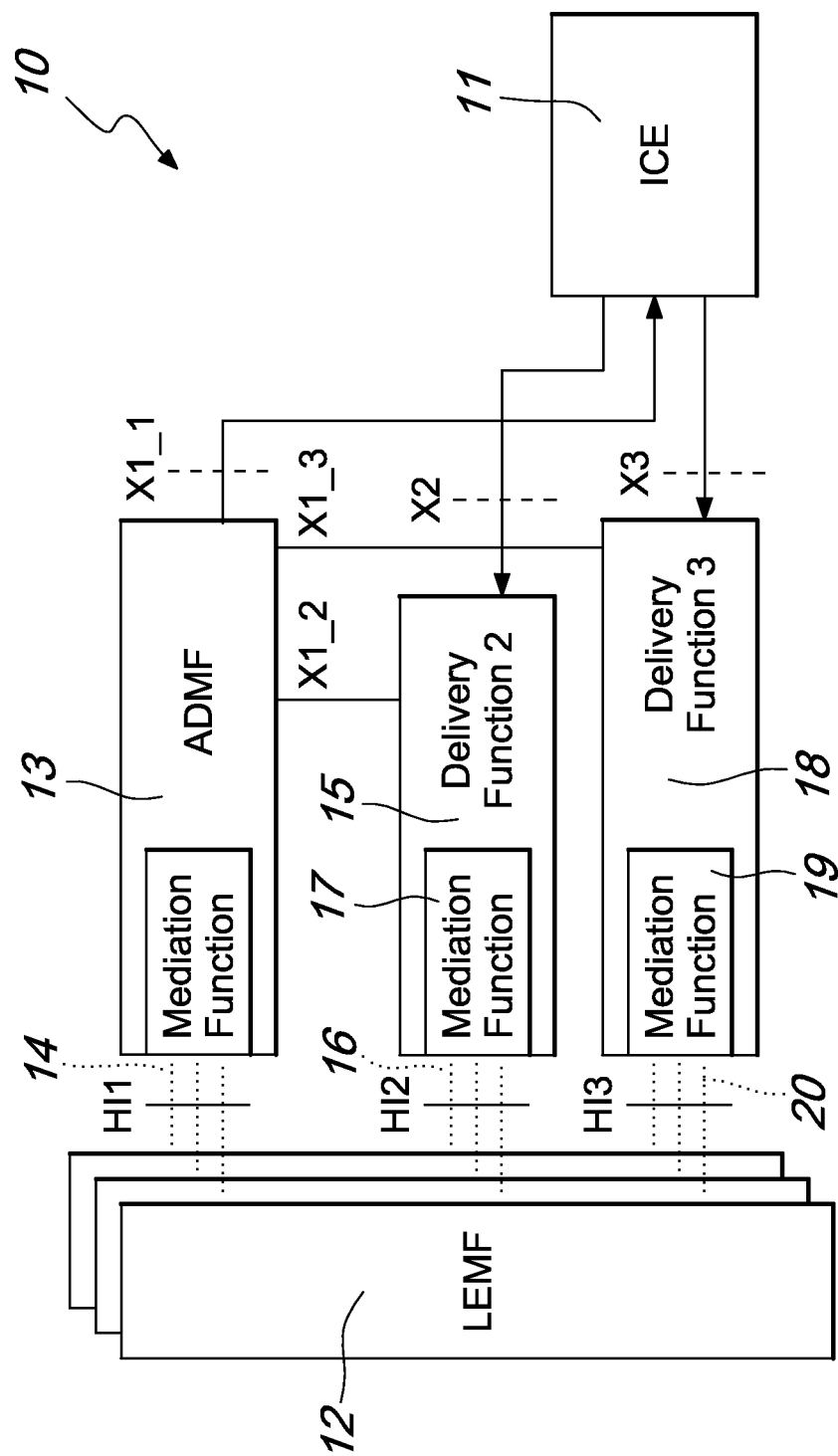
FIG. 1 is a Lawful Interception system according to an embodiment of the invention.

FIG. 1 shows a Lawful Interception (LI) system 10 for accessing communications related data and comprising an ICE, an ADMF and a DF2 according to a preferred embodiment of the invention.

Lawful Interception system 10 comprises an Intercepting Control Element (ICE) 11 adapted to issue Intercept Related Information and Content of Communications involving target users.

In one preferred embodiment of the invention, ICE 11 may be a Home Location Register (HLR).

In other embodiments, the ICE may be, for instance, any of a Mobile Services Switching Center (MSC) Server, a Gateway MSC Server (GMSC), a Serving GPRS Support Node (SGSN), a Gateway GSN (GGSN), or any other node which is adapted to use mobile station identification information as target identities.

Lawful Interception system 10 may further comprise one or more Law Enforcement Monitoring Facilities (LEMFs) 12, through which respective LEAs may receive interception information.

An Administration Function (ADMF) entity 13 may be configured for sending target identity and LI authorization data from the LEAs to the ICE 11. ADMF 13 may interface through a first Handover Interface 14 (HI1) with all the LEAs that may require interception in the intercepting network, while keeping intercept activities of individual LEAs separate and interfacing to the intercepting network. ADMF 13 may also be used to hide from ICE 11 that multiple activations by different LEAs on the same target may be in place. ADMF 13 may also be partitioned to ensure separation of the provisioning data from different agencies.

ICE 11 may be linked to ADMF 13 by means of its own X1_1 interface, in order to perform interception, i.e. activation, deactivation, interrogation as well as invocation, independently from other ICEs that may be present in the network.

In order to deliver the intercepted information to the LEAs, two Delivery Functions (DF) entities may be provided, each exchanging respective portions of information with ADMF 13, through X1_2 and X1_3 interfaces, and LEMF 12.

In particular, a DF2 entity 15 may be configured to receive Intercept Related Information (IRI) from the ICE, through an X2 interface, and to convert and distribute the IRI to the relevant LEAs via a second Handover Interface 16 (HI2) by means of a Mediation Function (MF) 17.

The IRI is a collection of information or data associated with telecommunication services involving the target identity, such as call associated information or data, e.g. unsuccessful call attempts, service associated information or data, e.g. service profile management by subscriber, and location information.

A DF3 entity 18 may be configured to receive Content of Communications (CC) information from ICE 11 through an X3 interface, and to convert and distribute such information to the relevant LEA through an MF 19 and a third Handover Interface 20 (HI3).

While IRI is exchanged between two or more users of a telecommunications service, CC includes information that, as part of some telecommunications service, may be stored for subsequent retrieval by another user.

Figure 2:
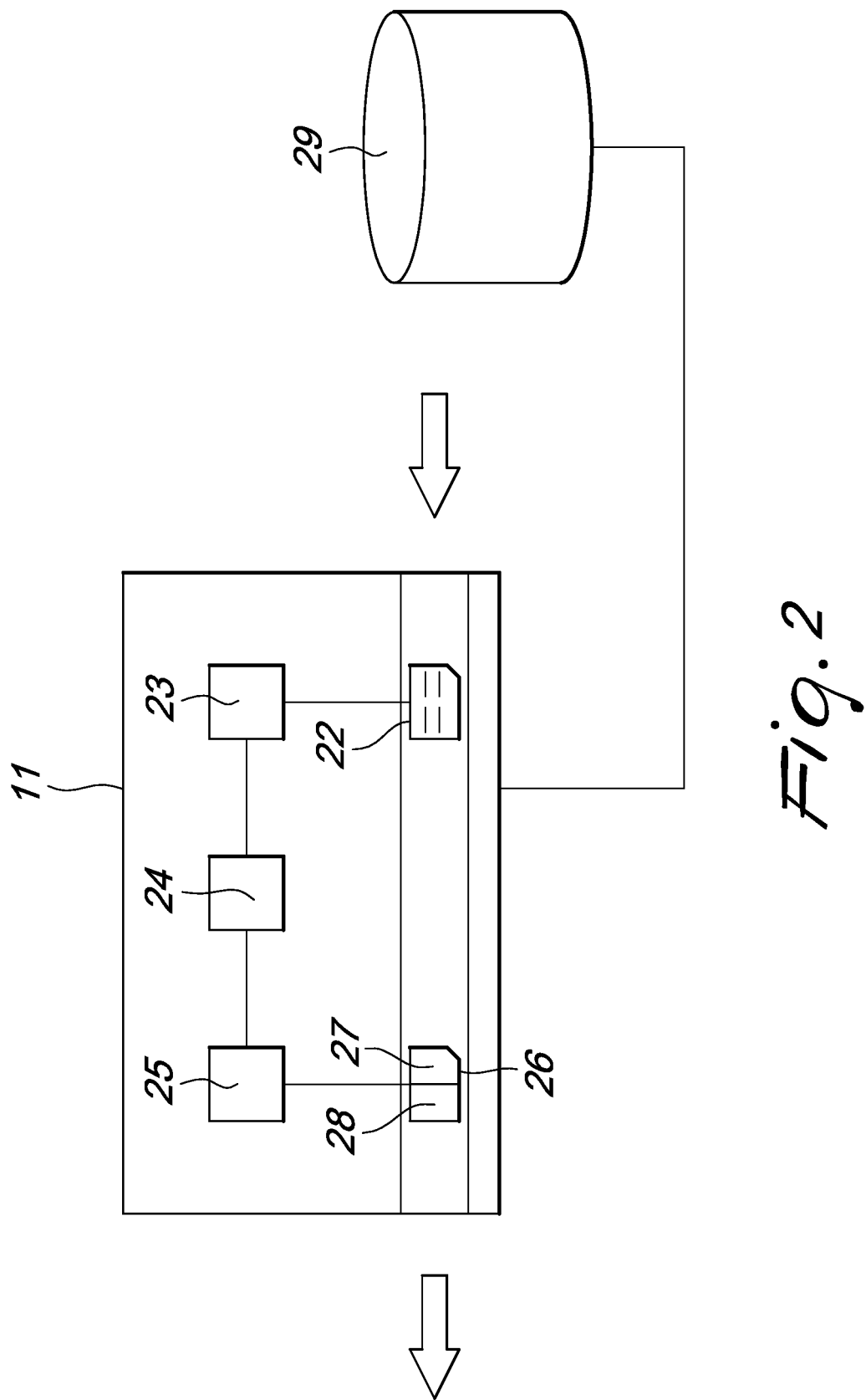
FIG. 2 is an HLR configured according to the invention.

FIG. 2 shows an ICE 11 according to the invention and which is configured to generate a notification message 26 for DF2 15 and includes the information about a change that occurred in at least one mobile station ID target identity (IMSI and/or IMEI) referred to a target user in a telecommunications network.

ICE 11 comprises means 23 for detecting current mobile station ID information of a target user, which may be carried by a message 22 received from a node of the network which is accessed by a target user. This event may occur for instance if the target user has changed the SIM card of his mobile phone or the mobile phone itself and tries to access the mobile telecommunications network anew.

Mobile station ID information may be at least one of the IMSI and/or IMEI.

A database 29 may be provided at ICE 11 (e.g., if the ICE is an HLR) or in communication with ICE 11 for storing mobile station ID information.

ICE 11 may further comprise comparing means 24 adapted to compare previous mobile station ID information and current 22 mobile station ID information.

Assuming that this comparison leads to the conclusion that the mobile station ID information has changed, means 25 for preparing a notification message 26, which may include both previous mobile station ID information 27 and current mobile station ID information 28, are also provided within the ICE 11.

A notification message 26 may accordingly comprise, for instance, both the old IMSI number, which was previously used and associated to the target user, and the new IMSI number which is currently used by the target user. Similarly, the notification message may comprise old and new IMEI values. In any of these cases, notification message 26 may be adapted to be communicated to the DF2 15 via a conventional X2 interface.

Figure 3:
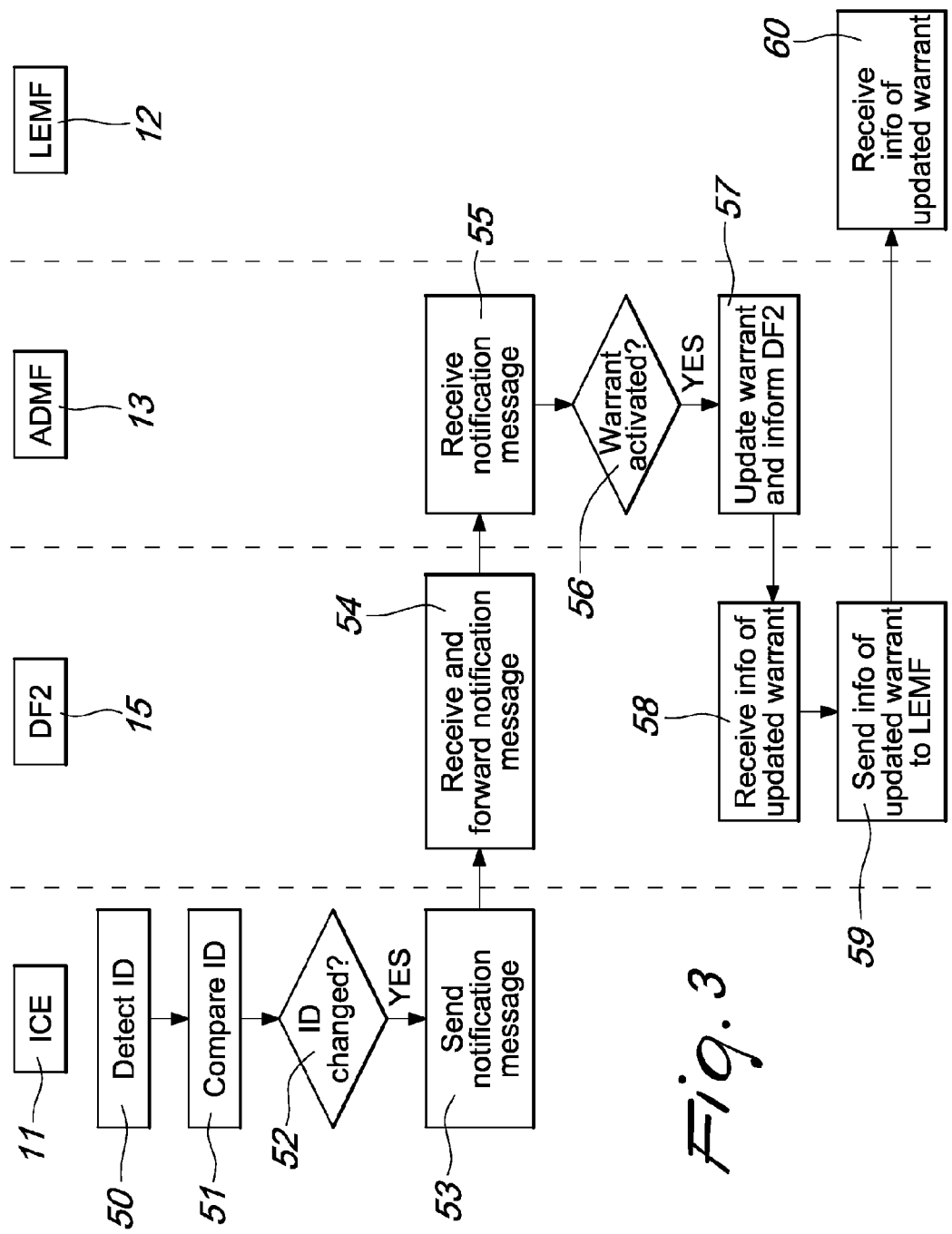
FIG. 3 is a flow diagram showing a method according to the present invention.

The operation of a Lawful Interception system 10 according to an embodiment of the present invention is depicted in the flow diagram of FIG. 3.

At step 50, current mobile station ID information is detected by detecting means 23 at ICE 11.

After this detection, a comparison between previous and current mobile station ID information is carried out at step 51.

At step 52, a comparison is made to check whether the mobile station ID information has changed between previous and current mobile station ID information.

For instance, if ICE 11 is an HLR, an IMSI changeover administered by the mobile services operator or the IMEI/IMEISV information received when the target user subscribes to the telecommunications network can be detected, and the MSISDN is associated to a new IMSI and/or IMEI value.

If it is detected that the mobile station ID information has changed, a notification message 26 is generated at step 53 by the preparing means 25, the notification message preferably containing both a previous mobile station ID information 27 and a current mobile station ID information 28. Notification message 26 may be sent by preparing means 25 to DF2 15 via the X2 interface.

At step 54, DF2 15 receives notification message 26 and forwards it to ADMF 13 on the X1_2 interface.

At following step 55, ADMF 13 receives notification message 26 indicating that the mobile station ID information concerning the target user has changed.

At step 56, a check is made to determine whether a warrant is already activated on the subscriber identified by the previous mobile station ID information 27. This information is now available because notification message 26 or content thereof, forwarded to ADMF 13, contains both previous mobile station ID information 27 and current mobile station ID information 28.

If there is already an activated warrant on the target subscriber identified by the previous mobile station ID information 27, at step 57 a warrant activation at ADMF 13 may be ordered, by updating the warrant with the current mobile station ID information 28 taken from notification message 26. The warrant based on the previous mobile station ID information may be optionally deleted or deactivated. ADMF 13 may then inform DF2 15, again via the X1_2 interface, of the update of the warrant activation.

At step 58, DF2 15 receives the information about the updated warrant, e.g. that the warrant based on the previous mobile station ID information has been automatically canceled and/or that the warrant based on the new mobile station ID information has been automatically activated. At step 59, DF2 15 sends this information to LEMF 12.

At step 60, LEMF 12 receives the information about the updated warrant through the HI2 interface. At this step every reference in the system to previous ID information 27 might have been deactivated, or replaced or integrated with a new reference. LEMFs 12 can now correctly monitor the target user whose ID information has changed and pass interception information to respective LEAs.

Figure 4:
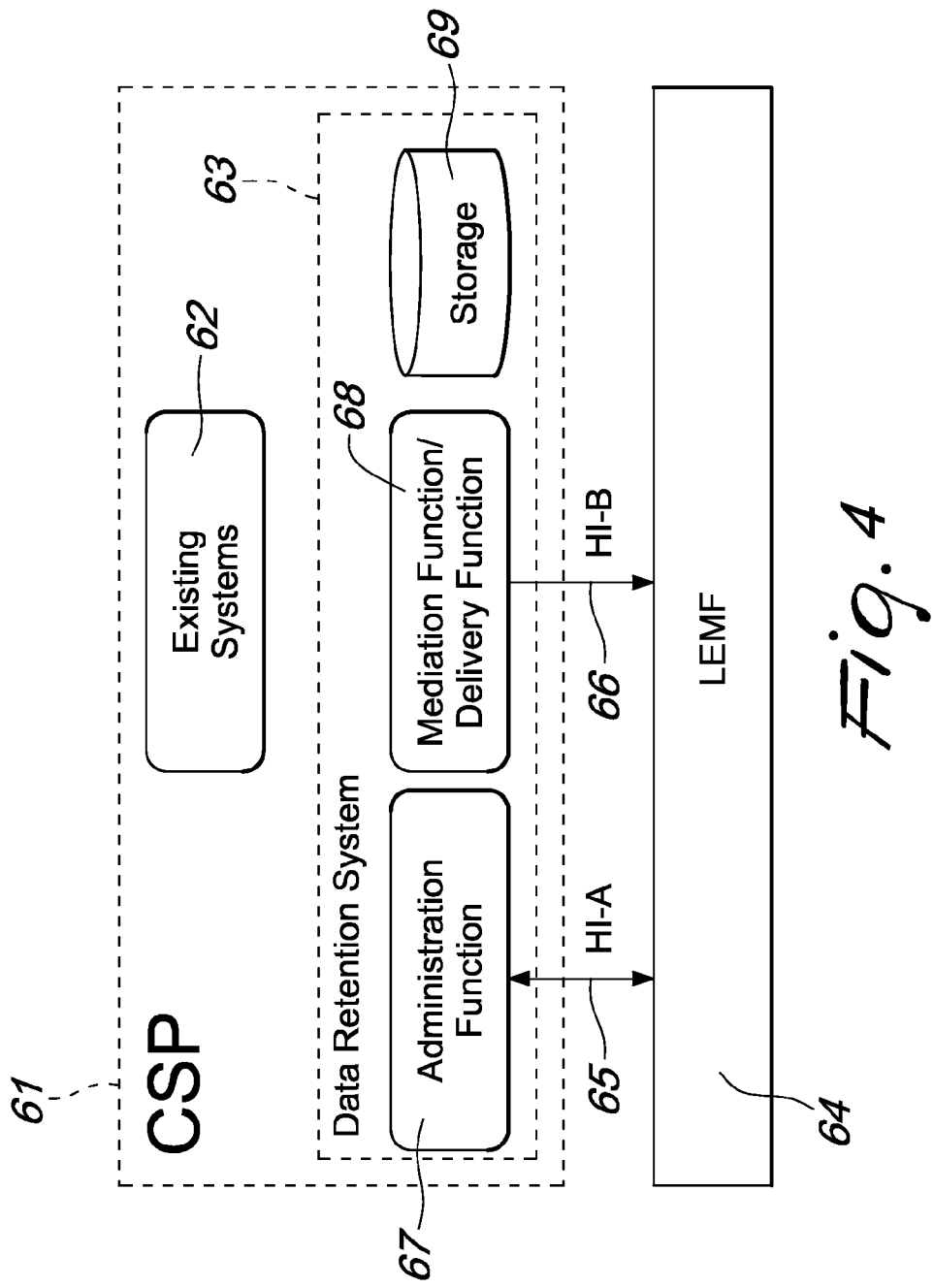
FIG. 4 is an arrangement of a service provider with Data Retention (DR) capabilities.

FIG. 4 shows another embodiment of the invention, this time with reference to a Data Retention (DR) System in a Communication Service Provider 61 (CSP). Specifically, CSP 61, which may incorporate existing communication systems 62, is provided with a Data Retention (DR) System 63 for exchanging retained data relating information with a Requesting Authority 64, which may be a Law Enforcement Monitoring Facility (LEMF).

The data exchanged between CSP 61 and Requesting Authority 64 comprises requests from Requesting Authority 64, corresponding responses from the DR system and other DR information, such as results of requests and acknowledgements of receipt. The interfaces through which the CSP 61 and DR system 63 exchange the above data with the Requesting Authority are conventionally denoted as Handover Interfaces.

A generic Handover Interface adopts a two-port structure in which administrative request/response information and Retained Data Information are logically separated. In particular, a first Handover Interface port HI-A 65 is configured to transport various kinds of administrative, request and response information from/to the Requesting Authority 64 and an organization at the CSP 61 that is responsible for Retained Data matters, identified by an Administration Function 67.

Also in this embodiment, warrants relating to target users are loaded in the Administration Function 67.

A second Handover Interface HI-B 66 may be configured to transport the retained data information stored in a repository 69 from CSP 61 to Requesting Authority 64. Such retained data is generated by at least one Data Retention Source (DRS) 38, which is preferably a node in the telecommunications network arranged to use mobile station identification information as target identities. Such DRS 38 may be configured to feature the same means of the ICE 11 depicted in FIG. 2.

The individual retained data parameters are to be sent to Requesting Authority 64 at least once, if available. To this aim, a Mediation/Delivery function 68 may be provided, for retrieving the retained data from the memory means 69 and forward such data to the Requesting Authority 64 in a suitable format through the HI-B 66.

Figure 5:
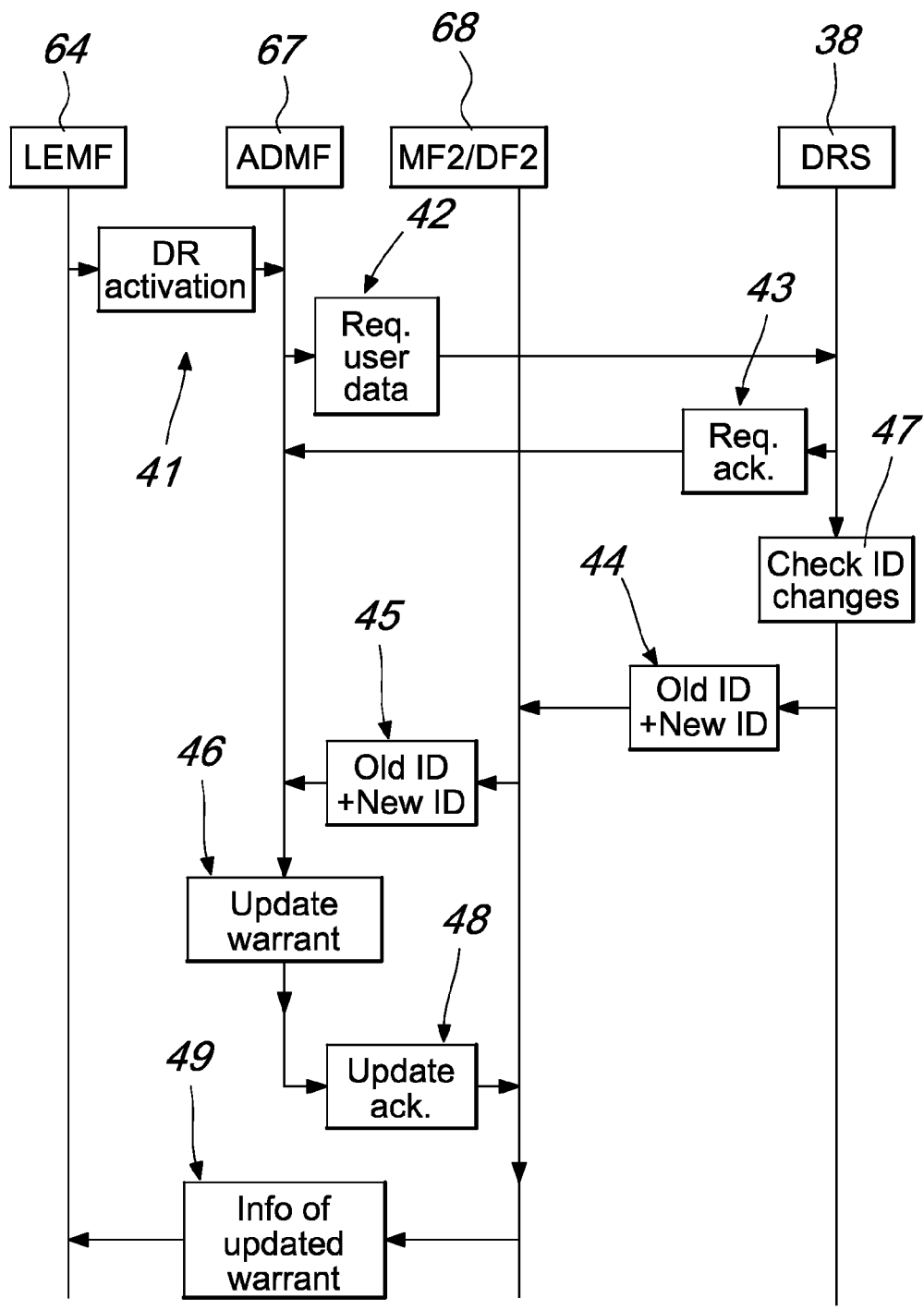
FIG. 5 shows the operation of the Data Retention management system according to a preferred embodiment of the invention.

FIG. 5 refers to the Data Retention management system, according to a preferred embodiment of the invention, for retrieving user data and checking mobile station ID information changes.

Mediation/Delivery Function 68 of the Data Retention management system is configured to provide historical user information to LEMF 64.

In step 41, a generic data retention request is sent by LEMF 64 of the various LEAs to ADMF 67. The request may contain an order to provide user retained data related to the target user.

In step 42, ADMF 67 sends a request message to DRS 38 for user retained data related to the target identity, identified by mobile station ID information such as IMSI and/or IMEI.

At step 43, DRS 38 acknowledges that the request was correctly received from the Data Retention management system.

Then, at step 47, DRS node 38 checks if the mobile station ID information has changed since the previous data retention request 41 from the same LEA. This check may be carried out according to the method, system and means as shown and described with reference to FIG. 2.

Assuming that a change in mobile station ID information is detected, at step 44 DRS 38 may send a message containing both the previous mobile station ID information and the new mobile station ID information to Mediation/Delivery Function 68.

Such message may then be notified to ADMF 67 at step 45. ADMF may then proceed automatically to update the warrant activation at step 46, based on the new mobile station ID information (e.g. new IMSI and/or new IMEI).

Warrants based on the previous mobile station ID information (e.g. old IMSI and/or old IMEI) may be removed, or retained for future use.

Warrant activation may be communicated to Mediation/Delivery Function 68 at step 48.

At the end of the procedure, Mediation/Delivery Function 68 may notify LEMF 64, by using the HI-B interface 66, that a warrant on the old mobile station ID information has been automatically updated, namely that a warrant on the new/current mobile station ID information has been automatically activated and, in case, that the previous warrant has been removed.

After appropriate acknowledgement of receipts transmitted from LEMF 64 to DRS 38 via Mediation/Delivery Function 68, the procedure may continue according to a same flow already used in the prior art, i.e. with delivery of retained data from DRS 38 to Mediation/Delivery Function 68 and transmission of the same information to LEMF 64 as an IRI message.

It has been thus shown that the invention fully achieves the intended aim and objects, since it gives the possibility to update automatically the warrant settings based on a monitored subscriber upon a change in his SIM card or his mobile equipment.

Clearly, several modifications will be apparent to and can be readily made by the skilled in the art without departing from the scope of the present invention. Therefore, the scope of the claims shall not be limited by the illustrations or the preferred embodiments given in the description in the form of examples, but rather the claims shall encompass all of the features of patentable novelty that reside in the present invention, including all the features that would be treated as equivalents by the skilled in the art.

Where technical features mentioned in any claim are followed by reference signs, those reference signs have been included for the sole purpose of increasing the intelligibility of the claims and accordingly, such reference signs do not have any limiting effect on the interpretation of each element identified by way of example by such reference signs.

The invention claimed is:

1. A method for managing the detection by a Law Enforcement Monitoring Facility (LEMF) of changes of mobile station ID information of a target identity in a telecommunications network, the method comprising the steps of:
   providing a node selected between an Intercept Control Element (ICE) and a Data Retention Source;
   at said node, comparing current mobile station ID information with previously stored mobile station ID information, wherein said mobile station ID information is at least one of an International Mobile Subscriber Identity (IMSI), an International Mobile Equipment Identity (IMEI) or a combination thereof;
   at said node, preparing a notification message including both said previous mobile station ID information and said current mobile station ID information, if in said comparing step it is detected that the mobile station ID information has changed;
   at said node, sending said notification message to an Administration Function (ADMF) which verifies, in response to said notification message, the existence of warrants related to said previous mobile station ID information, automatically generating an updated warrant based on said current mobile station ID information, and automatically deactivating existing warrants related to said previous mobile station ID information;
   informing said LEMF about said updated warrant.

2. The method of claim 1, wherein said node acting as said ICE is a Home Location Register (HLR) node.

3. A node of a telecommunications network, wherein said node is one of an Intercept Control Element (ICE) and a Data Retention Source and comprises:
   comparing means for comparing current mobile station ID information of a target identity with previously stored mobile station ID information of said target identity, said mobile station ID information is at least one of an International Mobile Subscriber Identity (IMSI), an International Mobile Equipment Identity (IMEI) or a combination thereof;
   preparing means for preparing a notification message including both said previous mobile station ID information and said current mobile station ID information if said comparing means detect that the mobile station ID information has changed, said preparing means being adapted to send said notification message to a Delivery Function of a Lawful Interception System, if said node is an ICE, or to a Delivery Function of a Data Retention system, if said node is a Data Retention Source;
   wherein said Delivery Function verifies, in response to said notification message, the existence of warrants related to said previous mobile station ID information, automatically generates an updated warrant based on said current mobile station ID information, and automatically deactivates existing warrants related to said previous mobile station ID information.

4. The node of claim 3, wherein said node acting as aid ICE is a Home Location Register (HLR) node.

5. A Lawful Interception System comprising the node of claim 3 as an Intercept Control Element (ICE) one or more Law Enforcement Monitoring Facilities (LEMFs) an Administration Function (ADMF) managing lawful authorities warrants and a Delivery Function, wherein the ADMF comprises:
   means for receiving said notification message including previous mobile station ID information and current mobile station ID information:
   means for verifying, in response to said notification message, the existence of warrants related to said previous mobile station ID information;
   means for automatically generating an updated warrant based on said current mobile station ID information;
   means for automatically deactivating existing warrants related to said previous mobile station ID information;
   means for informing said one or more LEMFs of said updated warrant, and
   wherein said Delivery Function is arranged to receive said notification message from said node acting as said ICE and to forward said notification message to said ADMF.

6. A Data Retention system comprising the node of claim 3 as a Data Retention Source, one or more Law Enforcement Monitoring Facilities (LEMFs), an Administration Function (ADMF) managing lawful authorities warrants and a Delivery Function, wherein the ADMF comprises:
   means for receiving said notification message including previous mobile station ID information and current mobile station ID information;
   means for verifying, in response to said notification message, the existence of warrants related to said previous mobile station ID information;
   means for automatically generating an updated warrant based on said current mobile station ID information;
   means for automatically, deactivating existing warrants related to said previous mobile station ID information;
   means for informing said one or more LEMFs of said updated warrant, and wherein said Delivery Function is arranged to receive said notification message from said node acting as said Data Retention Source and to forward said notification message to said ADMF.

* * * * *

UNITED STATES PATENT AND TRADEMARK OFFICE
CERTIFICATE OF CORRECTION

PATENT NO. : 8,706,089 B2  Page 1 of 1
APPLICATION NO. : 13/143496
DATED : April 22, 2014
INVENTOR(S) : Di Donato et al.

It is certified that error appears in the above-identified patent and that said Letters Patent is hereby corrected as shown below:

In the Claims

In Column 8, Line 13, in Claim 4, delete "as aid" and insert -- as said --, therefor.

In Column 8, Line 22, in Claim 5, delete "information:" and insert -- information; --, therefor.

In Column 8, Line 48, in Claim 6, delete "automatically," and insert -- automatically --, therefor.

Signed and Sealed this
Ninth Day of September, 2014

Michelle K. Lee
*Deputy Director of the United States Patent and Trademark Office*